United States Patent [19]

Gaylord

[11] 3,767,143
[45] Oct. 23, 1973

[54] QUICK RELEASE HARNESS

[75] Inventor: John A. Gaylord, Greenbrae, Calif.

[73] Assignee: H. Koch & Sons, Inc., Corte Madera, Calif.

[22] Filed: Oct. 8, 1971

[21] Appl. No.: 187,803

[52] U.S. Cl.............................. 244/151 A
[51] Int. Cl............................. B64d 17/30
[58] Field of Search.................... 244/151 R, 151 A, 244/151 B, 122 R, 122 AG, 122 AH, 122 B; 9/318; 285/33, 304, DIG. 21; 24/73 PH

[56] References Cited
UNITED STATES PATENTS

| 3,404,439 | 10/1968 | Jones et al. | 244/151 R |
| 3,632,066 | 1/1972 | Brown | 244/151 A |
| 3,658,281 | 4/1972 | Gaylord | 244/151 A |
| 2,448,688 | 9/1948 | Scheiwer | 285/304 X |
| 2,482,292 | 9/1949 | Sabbia | 285/33 X |
| 3,071,188 | 1/1963 | Raulins | 285/DIG. 21 |
| 2,726,832 | 12/1955 | Gimalouski et al. | 244/151 A |
| 3,090,979 | 5/1963 | Segrest | 9/318 |

Primary Examiner—Milton Buchler
Assistant Examiner—Carl A. Rutledge
Attorney—George B. White

[57] ABSTRACT

A parachute harness which has straps connecting to the canopy, side shoulder straps, a strap across the chest, and a pair of leg straps, severable connections between the shoulder straps which can be manually separated and also automatically separated by application of gas pressure; automatic gas operated release for the leg straps coupled with manually operable connections; manually operable as well as gas operated connection between parts of the chest strap; automatically and manually operable connecting and disconnecting device for oxygen supply to the face mask; gas connecting tubes to all the gas operated connectors as well as to the gas operated oxygen mask separator, and gas supply means located on the seat to be easily manipulable; a quick connector in the gas line from the gas supply means permits the pilot to rise from his seat without detaching the harness, the gas supply being normally closed until it is manually applied and is in the form of a cartridge pierced by manipulation.

4 Claims, 17 Drawing Figures

Patented Oct. 23, 1973

INVENTOR.
JOHN A. GAYLORD

BY George B. White
ATTORNEY

INVENTOR.
JOHN A. GAYLORD

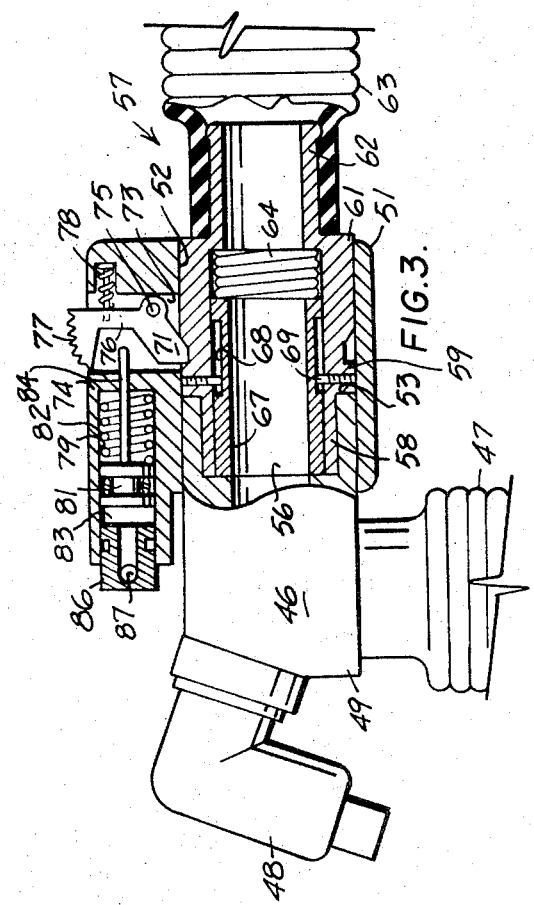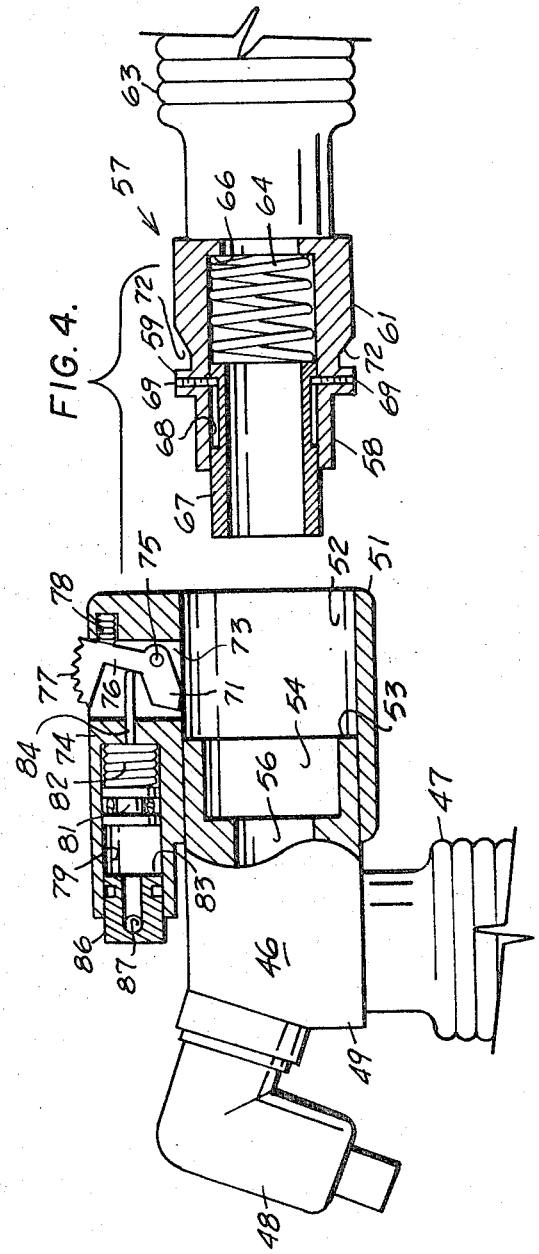

Patented Oct. 23, 1973

INVENTOR.
JOHN A. GAYLORD
BY George B. White
ATTORNEY

Patented Oct. 23, 1973
3,767,143
8 Sheets-Sheet 5
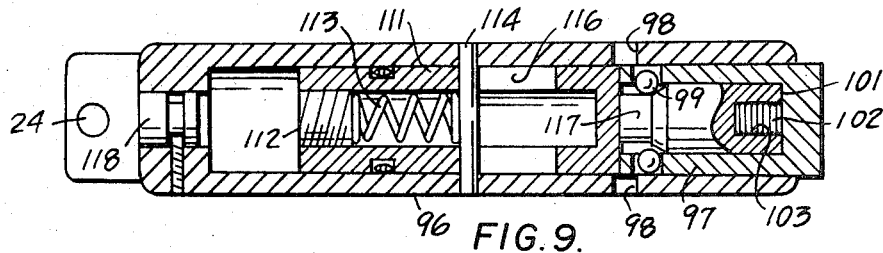
FIG. 9.
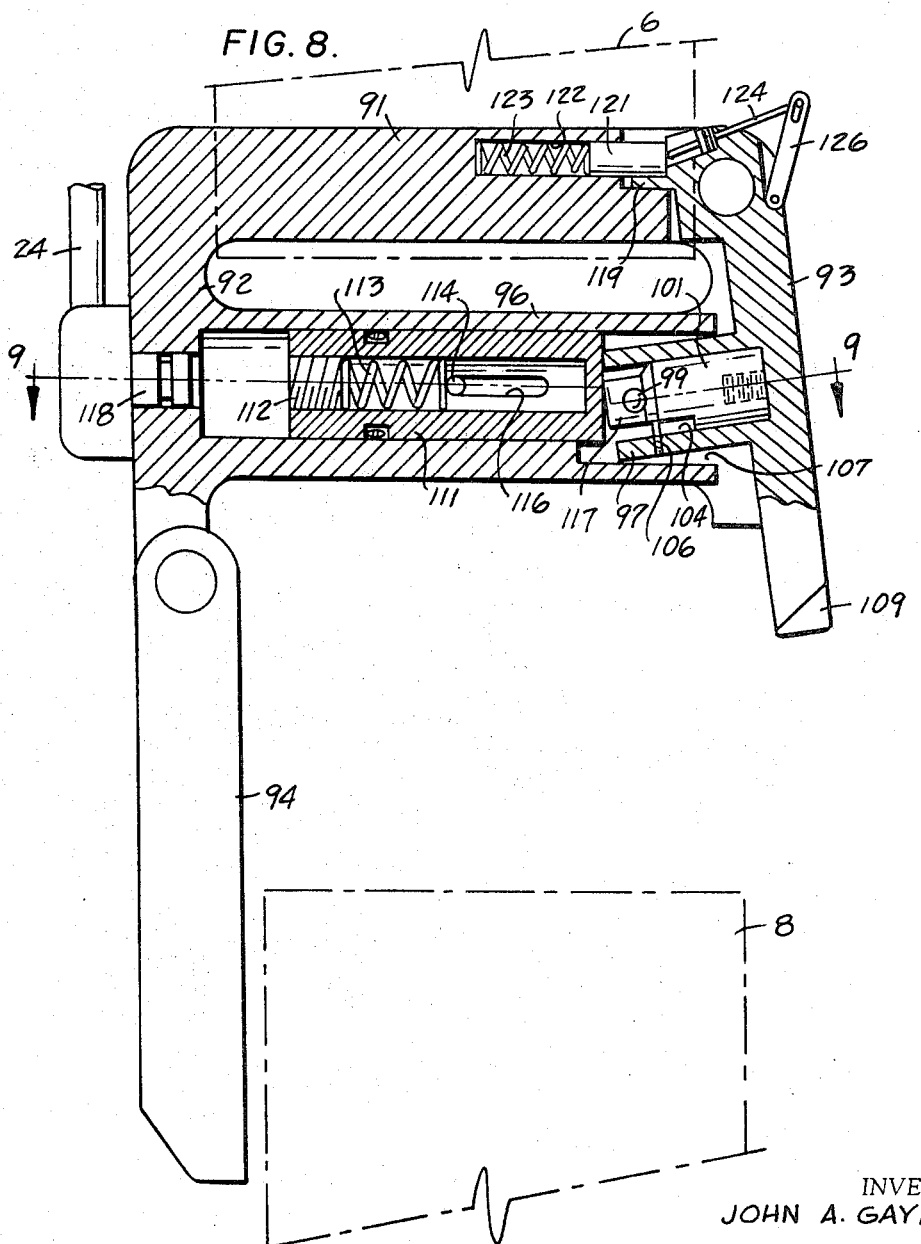
INVENTOR.
JOHN A. GAYLORD
BY George B. White
ATTORNEY

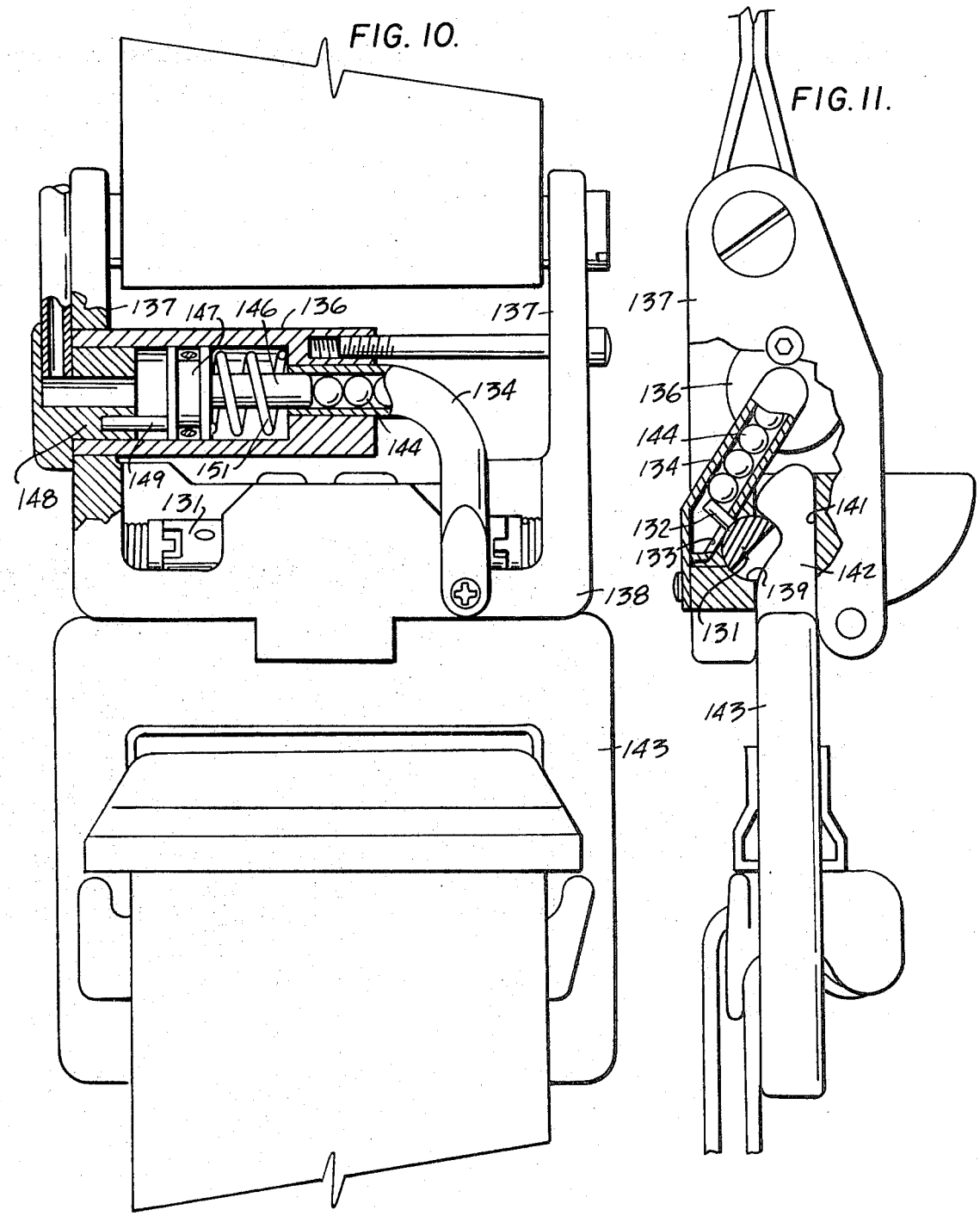

Patented Oct. 23, 1973
3,767,143
8 Sheets-Sheet 7
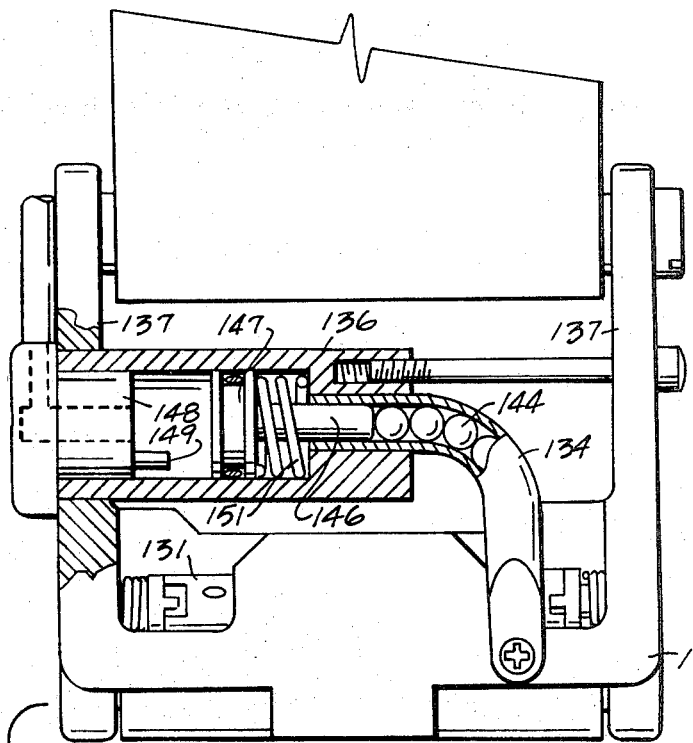
FIG. 12.
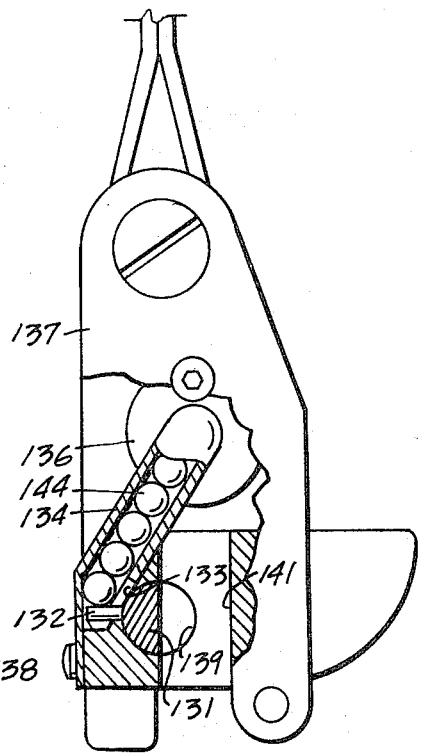
FIG. 13.
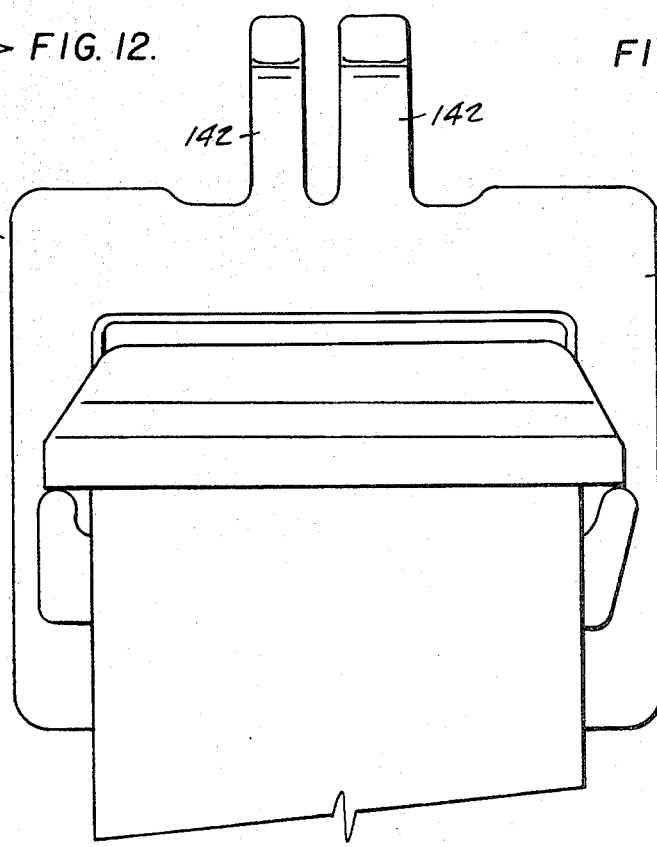
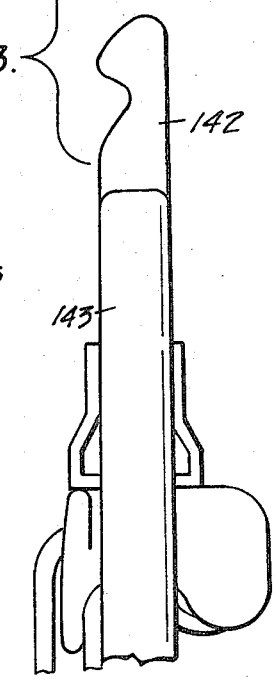
INVENTOR.
JOHN A. GAYLORD
BY George B. White
ATTORNEY

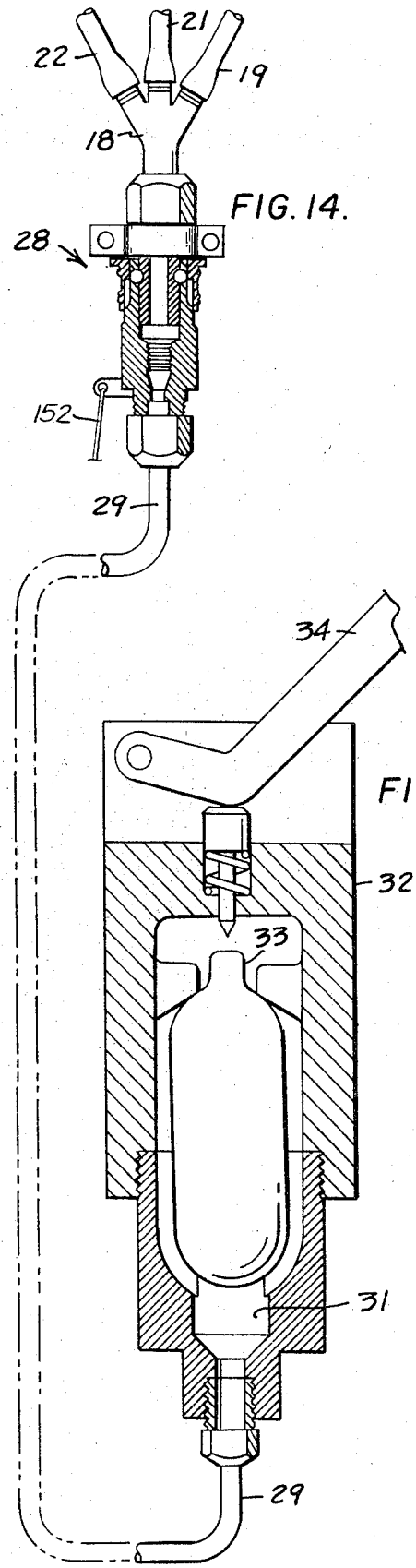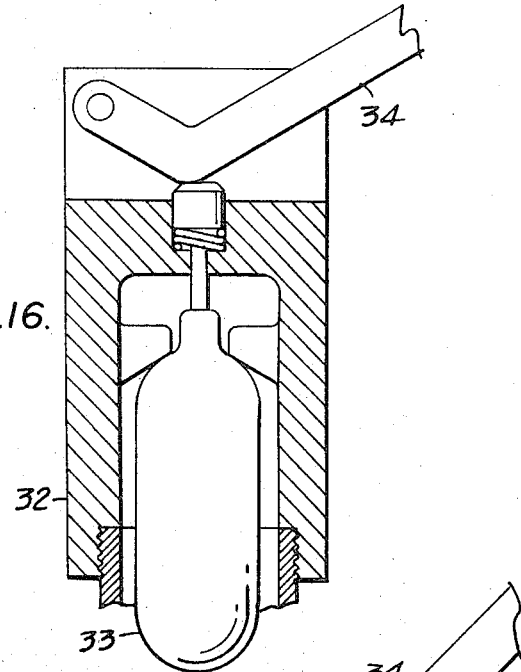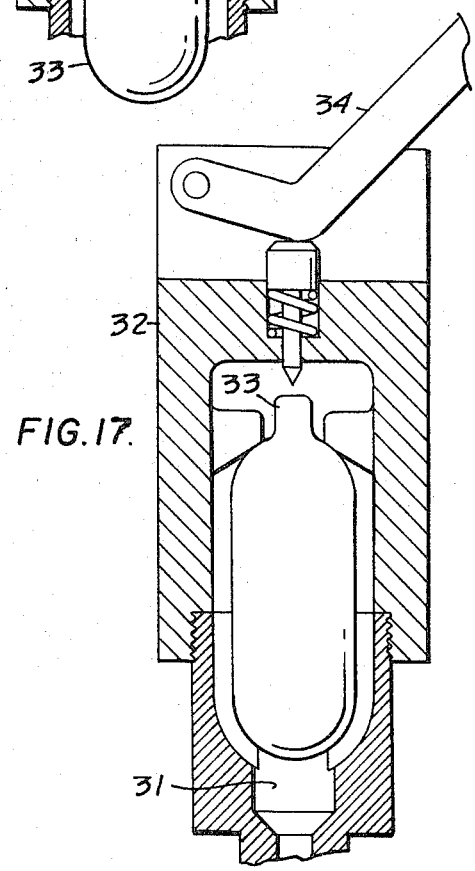

3,767,143

QUICK RELEASE HARNESS

BACKGROUND OF THE INVENTION

In view of the vital importance of quick release from a parachute harness, there are continuous improvements essential in order to solve problems as they arise from time to time. The herein invention is primarily to accelerate and render the quick release more positive than in previous devices and also to automatically separate the oxygen supply to the face mask by the same simple manipulation which releases all the gas operated connections, whereby the pilot can free himself from all restraint in the harness almost instantaneously, and can rise from the seat unrestrained in case of emergency.

Another object of the invention is to provide a single cartridge and such connections to the individual strap connectors and to the separable mask supply connector whereby the gas under pressure releases them positively and quickly, to facilitate both the fastening of the harness on the person and also the freeing of the person from the harness so that the person can rise from his seat either with his harness on or freed from his harness at will.

DESCRIPTION OF FIGURES

FIG. 3 is a partly cross-sectional view of the connector in the oxygen line to the mask in connected position.

FIG. 4 is a partly sectional view of the connector for the mask oxygen line separated.

FIG. 8 is a sectional view of the automatic mainsling connector separated.

FIG. 9 is a sectional view on about lines 9—9 of FIG. 8.

FIG. 10 is a partly sectional view of the automatically releasable connector for the leg straps.

FIG. 11 is a side view, partly in section, of the connector shown in FIG. 10.

FIG. 12 is a partly sectional view of the connector of FIG. 10 after release.

FIG. 13 is a side view, partly in section, of the leg strap connector after release.

FIG. 14 is a cross-sectional view of the quick disconnect in the gas line.

FIG. 15 is a cross-sectional view of the cartridge holder and penetrator.

FIG. 16 is a fragmental sectional view showing the cartridge penetrator in penetrating position.

FIG. 17 is a fragmental sectional view showing the penetrator with-drawn to release the gasses.

DETAILED DESCRIPTION

Figure 1:
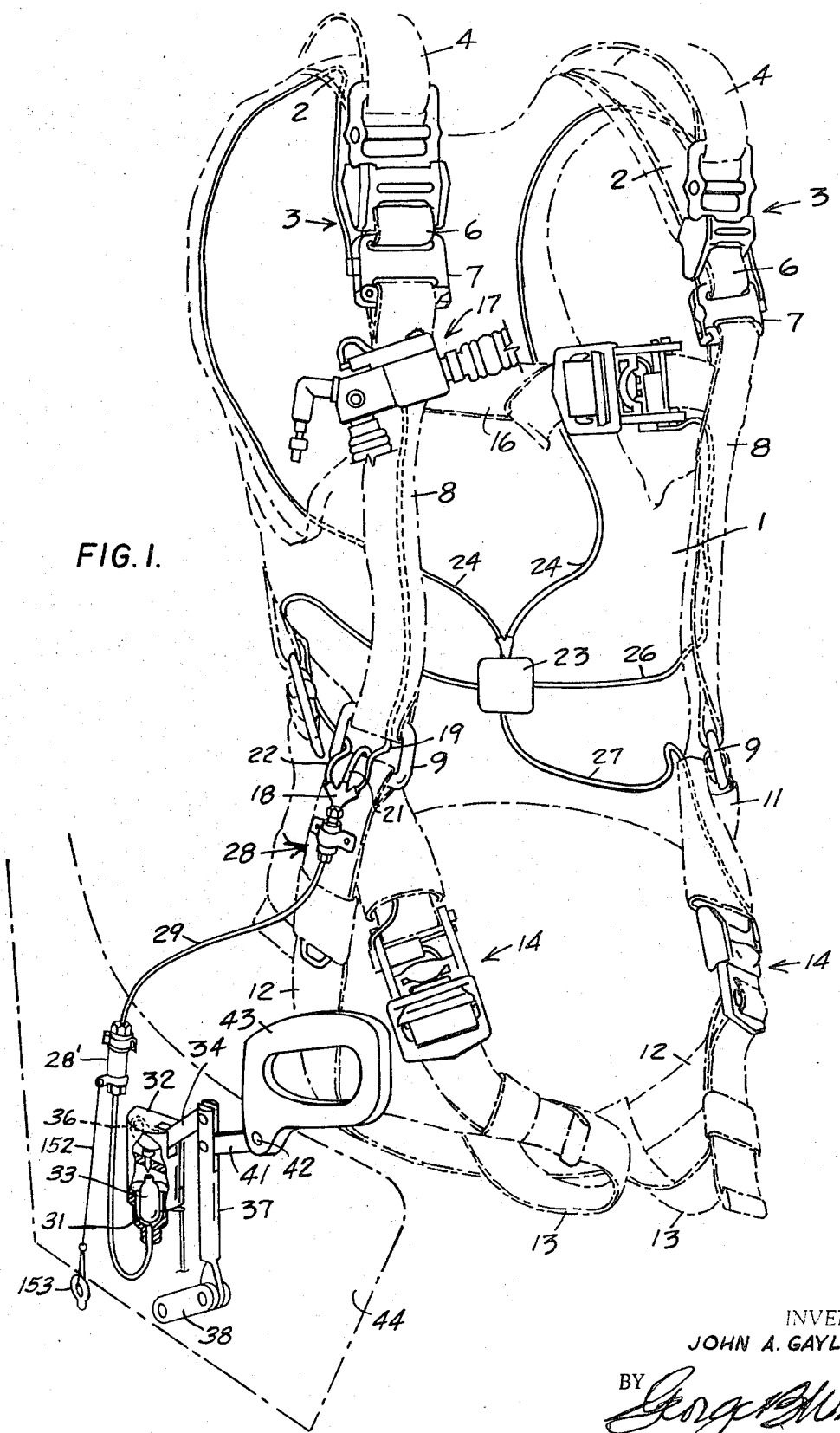
FIG. 1 is a diagrammatic view showing the harness straps in broken lines and the various connections in connected position.

The harness includes a harness body 1 which fits over the back of the person and which has shoulder straps 2 each of which is connected to a manipulable and releasable main sling connector 3 and which is connected to a canopy strap 4 for suitable connection to the parachute. Each main sling connector 3 is in turn connected by a short strap 6 to an automatic gas operated gas pressure actuated connector 7, which latter is also connected to a side strap 8. The side strap 8 is connected by a suitable ring or loop 9 to a suitable flap 11 and to a seat strap 12 which extends across and under the thighs or seat of the person. From the lowest portion of the seat strap 12 extend a pair of leg straps 13. Each leg strap 13 has its upper end suitably secured to the opposite sides of the lower end of the body 1. A leg strap connector 14 is interconnected to each leg strap and is of a type which is both manually operable and also automatically releasable by gas pressure.

A chest strap 16 has its opposite ends connected to the respective side straps 8. A separable connector 14 of the same type as the leg strap connector 14 is interconnected in the chest strap 16 to permit both manual and automatic release. A releasable oxygen connector 17 is suitably supported on one of the side straps 8 and is connected to the releasing pressure system of all the connectors for separating the oxygen connection simultaneously with the release of the strap connectors 7 and 14.

The gas pressure releasing system includes a three-way intake manifold 18. The conduits leading from said intake manifold 18 are preferably flexible tubes. The first tube 19 connects the manifold to the releasable oxygen connector 17 and extends along the adjacent side strap 8. The second tube 21 extends along the adjacent portion of the leg strap 13 down to the adjacent leg strap connector 14. The third tube 22 extends along the harness body 1 to a distributing manifold 23. The distributing manifold 23 has a flexible tube 24 extended to each of the shorter strap connectors 7. The distributing manifold 23 also has a flexible tube 26 to the connector 14 in the chest belt 16. The manifold 13 also has a downwardly extended flexible tube 27 to the other leg strap connector 14. Thus whenever gas under pressure is introduced into the intake manifold 18 it can simultaneously actuate all the releases in the manner hereinafter described.

The intake manifold 18 is connected by a coupling 28 secured on the upper portion of the seat strap 12 of the type hereinafter described, whereby the coupling can be disconnected from the supply hose 29 to permit the person to rise from the seat with the parachute on him without disconnecting the harness strap connections.

Figure 2:
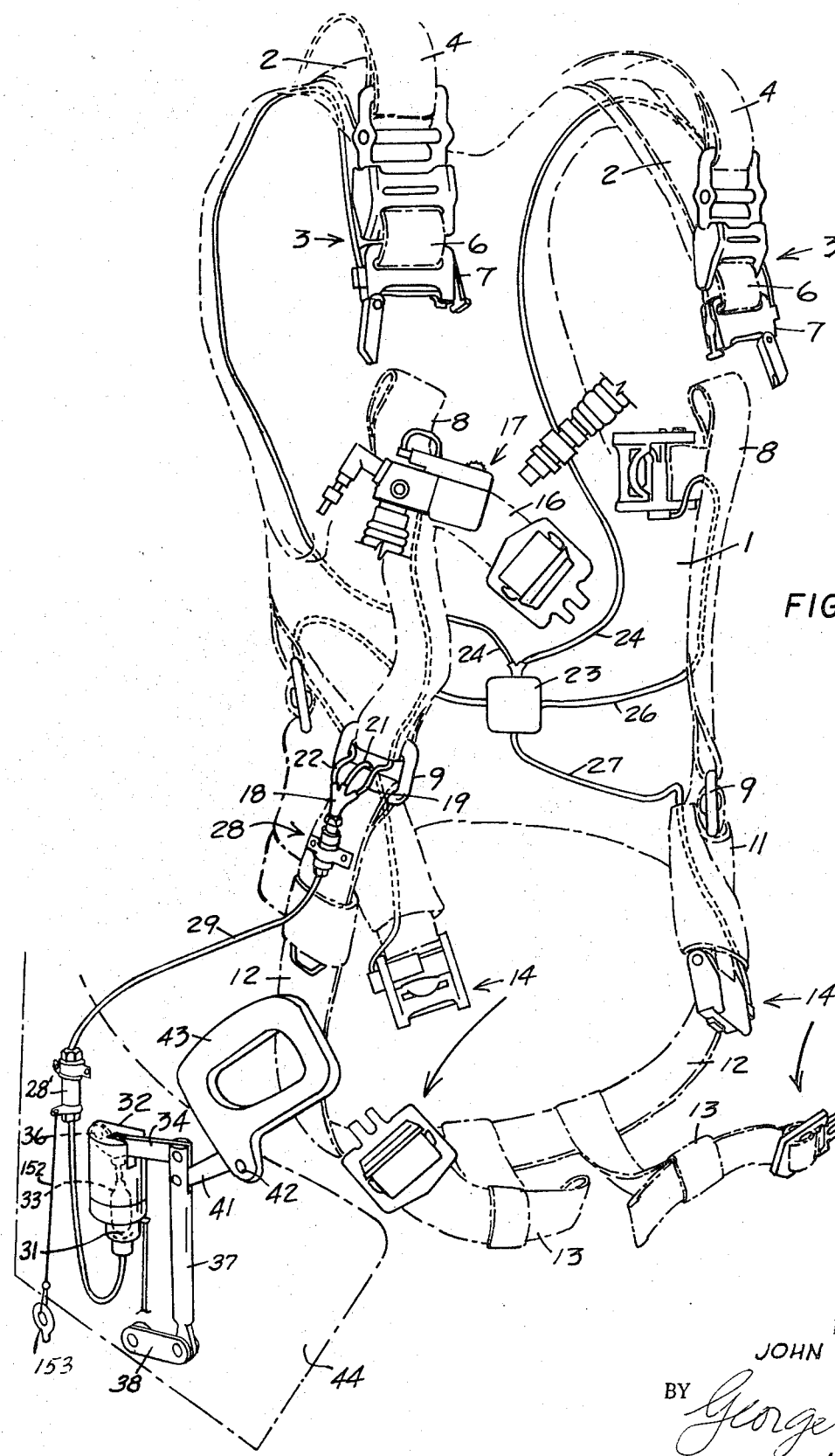
FIG. 2 is a perspective view showing the harness straps in broken lines and of the connections separated after the cartridge piercing device has been operated.
Figure 6:
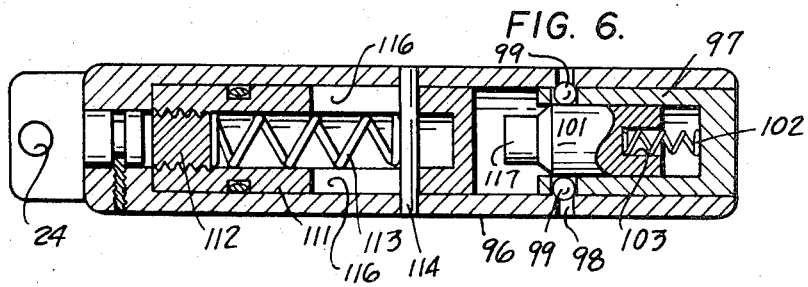
FIG. 6 is a sectional view of the automatic mainsling connector taken on about lines 6—6 of FIG. 5.

The hose 29 connects to the lower end of a gas chamber 31 of a cartridge housing 32 in which is held a suitable cartridge 33 containing, for instance, carbon dioxide under pressure of the usual type having an end adapted to be pierced. A piercing arm 34 is pivoted in the housing 32 and operates a piercing point 36 for piercing the cartridge and thereby releasing the pressure medium. The piercing arm 34 extends through an elongated slot 38 above and insulated from the gas chamber in the housing 32 in a suitable manner, and is pivoted at its outer end to the top of a link 37 pivotally connected to another link 38, which latter is pivoted on the seat 44. A lateral crank arm 41 extends from the pivot 42 to a handle 43. The pivot 42 is suitably fastened on the side 44 of the seat within reach of the hand of the person. Thus by pulling the handle 43 up from the position shown in FIG.1 into the position shown in FIG. 2, the piercing arm 34 is pressed downwardly causing the pressing of the piercing point 36 to pierce the cartridge 33 and release the pressure medium into the hose 29 for rapid distribution through the several manifolds and flexible tubes for simultaneous release of all the strap connectors and the oxygen mask connector.

The oxygen mask connector 17 as shown in FIGS. 3 and 4 has a body 46. The connector body 46 has an oxygen supply tube 47 and an emergency oxygen supply connection 48 on its closed end 49. The open end 51 of the oxygen connector body 46 has a circular pocket 52 terminating at a shoulder 53 and a smaller pocket 54 which communicates with the passage 56 of the body 46. Into the pockets 52 and 56 fits the tubular end of a connector plug 57. The tubular end 58 fits into the smaller pocket 54 and has an annular flange 58 which abuts against the shoulder 53. The larger portion 61 fits into the larger pocket 52 and has a nipple 62 to accommodate a flexible hose 63 leading to the oxygen mask of the person. Inside the larger portion 61 is a coil spring 64 bearing at one end against a shoulder 66 and at its other end against a sliding sleeve 67 abutting against the end of the smaller pocket 54 as shown in FIG. 3, thereby to compress the coil spring 64. An elongated annular groove 68 on the periphery of the sleeve 67 travels on a set screw 69 extended through the flange 59 for limiting the sliding of the sleeve 67.

The connector plug 57 is held in place by a dog 71 engaging an annular keeper groove 72 adjacent the flange 59. The dog 71 is in a recess 73 in a casing on the top of the connector body 46 projecting over the pocket 52 as shown in FIG. 4. A pivot 75 fulcrums the dog 71. An arm 76 movably extends through the recess 73 and terminates in a knurled head 77. A coil spring 78 in the side of the recess 73 bears against the arm 76 normally to urge the dog 71 into the keeper groove 72. The casing 74 has a cylinder 79 in which reciprocates a piston 81 normally urged by a coil spring 82 against a stop 83 in the cylinder 79. A pin 84 extends from the piston through the wall of the recess 73 opposite to the coil spring 78 for rocking the arm 76 when the piston 81 is moved toward the arm 76. In the outer end of the cylinder 79 is fixed a plug 86 with an inlet 57 to conduct the pressure medium for moving the piston 81 thereby to trip the arm 76 for withdrawing the dog 71 from the keeper groove 72 whereupon the stored energy in the coil spring 64 is permitted to withdraw the plug 61 from the pockets 52 and 54 and disconnect the oxygen supply. By manually pulling the knurled head 77 the dog can be withdrawn and the connector separated at will.

The pressure medium operated connector 7 has a frame formed of a web holder bar 91, an end bar 92 at right angles on one end of the web holder bar 91, a pivoted end bar 93 pivoted on the other end of the web holder bar 91, and a releasable web holder bar 94 pivoted on the end of the fixed end bar 92. A cross bar 96 between and parallel with the web holder bars 91 and 94 contains a releasable catch and a pressure medium actuated release device to be hereinafter described.

The cross bar 96 is tubular. A hollow boss 97 extends from the pivoted end bar 93 into the open end of the tubular cross bar 96. The tubular cross bar 96 and the hollow boss 97 have registering keeper holes 98 wherein catch balls 99 hold the hollow boss 97 and the pivoted end bar 93 locked to the tubular cross bar 96.

Figure 5:
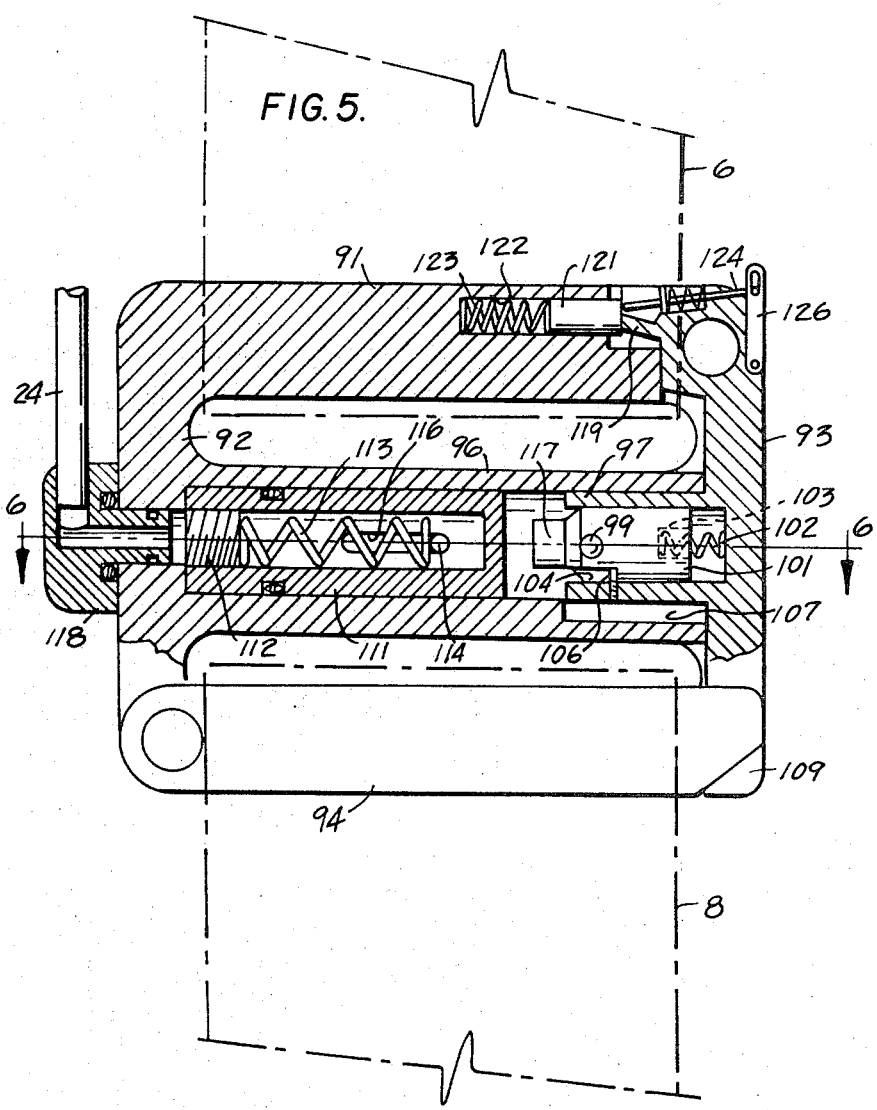
FIG. 5 is a sectional view of the automatic mainsling connector.
Figure 7:
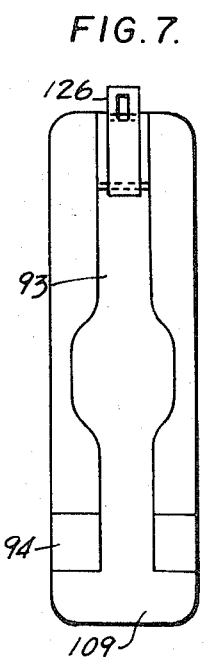
FIG. 7 is an end view of the automatic mainsling connector.

In the hollow boss 97 is a plunger 101 holding the catch balls 99 in locking position. A coil spring 102 in a pocket 103 in the plunger 101 bears against the bottom of the hollow boss 97 to urge the plunger 101 into locking position. The plunger 101 has a slot 104 on one side thereof which rides over a stop pin 106 to limit the movement of the plunger 101 to said locking position. A recess 107 in the end of the tubular cross bar 9 extending the full length of the hollow boss 97 along the side nearest to the pivoted web holder bar 94 permits the movement of the hollow boss 97 from the position shown in FIG. 5 into the position shown in FIG. 8 to permit the outward swinging of the pivoted end bar 93 to release the releasable web holder bar 94. The forked end 108 of the releasable web holder bar 94 straddles the T-shaped free end of the pivoted end bar 93 and rests on the cross head 109 of the T-shaped end to be held in web holding position until the pivoted end bar 93 is swung outwardly into the position shown in FIG. 8.

The releasing device for the connector 7 includes a hollow piston 111 with its closed end opposite the plunger 97. A threaded plug 112 in the open end of the hollow piston 111 holds a coil spring 113 against a cross pin 114 extended across the tubular cross bar 96 and through elongated slots 116 to permit movement into the position shown in FIG. 8 whereby the plunger 101 is pushed into releasing position shown in FIG. 8 so that its reduced end 117 frees the catch balls 99 as shown in FIG. 9. The hollow piston 111 is moved by the pressure medium admitted through an intake conduit 118 from the respective flexible tubes 24.

In order to more firmly hold the pivoted end bar 93 interlocked with the releasable web holder bar 96, a finger 119, extended from the hub of the pivoted end of the pivoted end bar 93, bears against a pin 121 in a pocket 122 pushed outwardly by a coil spring 123, so that the line of force is exerted above the pivot to urge the pivoted end bar 93 into locking position. When the pivoted end bar 93 is swung outwardly the finger 119 slips below the pin 121, but when the bar 93 is again returned into locking position a spring pressed rod 124 pivoted on a pivoted link 126 holds the pin 121 out of the way of the finger 119.

Each strap connector 14 is generally of the same type as shown in U.S. Pat. No. 3,330,014 on Releasable Strap Connector, issued on July 11, 1967 to John A. Gaylord, but it is adapted for release by a pressure medium in addition to the previous manual operation. The improvements are shown partly in cross section in FIGS. 10, 11, 12 and 13. Namely the rocking shaft 131 has a finger 132 extended radially through an elongated slot 133 into a guide tube 134 which latter is curved to reach into the closed end of a cross bar 136 between the parallel legs 137 of the frame 138. The shaft 131 is rockable in a bearing hold 139 as described in said patent, and is cut away diametrically at keeper pockets 141 for suitable prongs 142 of the male member 143. A series of balls 144 in the tube 134 bear on the finger 132 so that when a plunger pin 146 is pushed by a piston 147 the balls 144 push the finger 132 down, viewing FIG. 11, into the position shown in FIG. 12 for rocking the shaft 131 into prong releasing position. An intake plug 148 in the cylinder in the hollow cross bar 136 admits the pressure medium from the respective tube 21, 26 or 27. A stop pin 149 spaces the piston from the intake plug 148, and a coil spring 151 around the plunger pin 146 normally urges the piston 147 toward the stop pin 149. After each release the coil spring 151 returns the piston 147 into its initial position shown in FIG.10 and retracts the plunger pin 146, permitting the returning spring action on the rocking shaft 131 to return the finger 132 and the balls 144 into their respective initial positions. The finger 132 remains free to be rocked downward when the shaft 131 is rocked manually for releasing the prongs 142 as described in said patent.

Another coupling 28' is interconnected in the hose 29 and in this instance the separable lower portion of the coupling is connected by a cord 152 to an eye 153 secured to the floor of the aircraft so as to automatically separate the coupling 28 when the seat is ejected from the aircraft.

In operation if the person wants to rise from his seat with the harness on, by severing the lower portion of the coupling 28, he is separated from the gas line 29. In the event of an emergency necessitating the person to free himself of the parachute harness and rise from the seat without the parachute harness on, the person pulls the handle 43 and pierces the cartridge 33 in the manner heretofore described whereupon all the connections on the parachute harness as well as the connection to the gas mask are instantly severed and the person is freed to walk away from his seat unrestrained. When the seat is ejected, then the cord 152 pulls the coupling 28' apart so that thereafter the connecting devices must be manually disconnected. In the alternative the lower portion of the coupling 28 could be connected by the cord 152 to the floor of the aircraft for such automatic severing of the gas conduit when the person and his seat are ejected from the aircraft.

I claim:

1. In a single release device for a parachute harness on the seat of an aircraft,
said harness including,
a harness body fitting a person,
shoulder straps extending from said harness body over the shoulders and in front of said person downwardly,
perpendicular side straps extending from the shoulder strap downwardly,
a chest strap extending across between the side straps over the chest of the person,
leg straps extendable about the thighs of said person upwardly to the said body adjacent the lower ends of said side straps,
separable connecting devices between each shoulder strap and the adjacent perpendicular side strap, intermediate said chest strap and between each leg strap and said connection adjacent said side straps,
each separable connecting device including a manually operable connection and a gas pressure actuated connection,
a single pressure medium supply means,
an interconnected conduit system on said straps to conduct the pressure medium from said supply means simultaneously to the respective gas operated connections,
and a single manipulable device for said supply means to release said pressure medium into said conduit system,
said single pressure medium supply means including,
a hollow casing mounted on said seat,
a pressure medium cartridge in said casing having a pierceable end for releasing pressure medium from said cartridge positioned in said casing,
a conduit leading from the cavity of said casing to said conduit system,
a piercing plunger extended into the cavity of said casing to said pierceable end of said cartridge,
means to press said piercing plunger to pierce said cartridge, and a handle within reach of said person for manually operating said pressing means for piercing said cartridge,
a separable coupling between said connecting conduit from said cavity and said conduit system, and
means to connect one part of said separable coupling to a part of said airplane, whereby the pull of said conduit system separates the other part thereby to disconnect said conduit system from said casing.

2. In a single release device for a parachute harness,
said harness including,
a harness body fitting a person,
shoulder straps extending from said harness body over the shoulders and in front of said person downwardly,
perpendicular side straps extending from the shoulder strap downwardly,
a chest strap extending across between the side straps over the chest of the person,
leg straps extendable about the thighs of said person upwardly to the said body adjacent the lower ends of said side straps,
separable connecting devices between each shoulder strap and the adjacent perpendicular side strap, intermediate said chest strap and between
each leg strap and said connection adjacent said side straps,
each separable connecting device including a manually operable connection and a gas pressure actuated connection,
a single pressure medium supply means,
an interconnected conduit system on said straps to conduct the pressure medium from said supply means simultaneously to the respective gas operated connections,
and a single manipulable device for said supply means to release said pressure medium into said conduit system,
each connector between a shoulder strap and a side strap including
a fixed end bar,
a web holder bar extended from one end of the end bar,
a pivoted end bar pivoted on the free end of said web holder bar,
a releasable web holder bar pivoted on the other end of said fixed end bar,
the adjacent ends of said pivoted end bar and pivoted web holder bar being interconnected and being releasable by the swinging of said pivoted end bar away from said fixed end bar,
a tubular cross bar between the parallel with said web holder bars,
a tubular extension on said pivoted end bar insertable in the free end of said tubular cross bar,
the free end of said tubular cross bar being enlarged to permit the pivoted swinging of said tubular extension relatively to the free end of said tubular cross bar, a piston reciprocable in said tubular cross bar from said fixed end bar toward said tubular extension, means to conduct gas from one of said pressure medium conduits through said fixed end and against said piston thereby moving said piston for pushing said tubular extension out of said tubular cross bar thereby to release said pivoted web holder bar, an abutment plunger in said tubular extension of said pivoted end a releasable catch between said abutment plunger and said tubular extension to hold said tubular extension in abutting position projecting beyond the end of said tubular extension, and spring means between said abutment plunger and the end of the cavity in said tubular extension to urge and hold said abutment plunger in abutting position.

3. In a single release device for a parachute harness, said harness including, a harness body fitting a person, shoulder straps extending from said harness body over the shoulders and in front of said person downwardly, perpendicular side straps extending from the shoulder strap downwardly, a chest strap extending across between the side straps over the chest of the person, leg straps extendable about the thighs of said person upwardly to the said body adjacent the lower ends of said side straps, separable connecting devices between each shoulder strap and the adjacent perpendicular side strap, intermediate said chest strap and between each leg strap and said connection adjacent said side straps, each separable connecting device including a manually operable connection and a gas pressure actuated connection, a single pressure medium supply means, an interconnected conduit system on said straps to conduct the pressure medium from said supply means simultaneously to the respective gas operated connections, and a single manipulable device for said supply means to release said pressure medium into said conduit system, each of said connecting devices for said leg straps, and for said chest strap, including, a male and female member, manipulable means to release the male member from the female member, said male and female member each being adapted to hold the separable portions of the respective straps, at least one keeper pocket in said female member, at least one prong on said male member insertable into said keeper pocket, a rocking shaft in said female member intersecting said keeper pocket and being cut away at said pocket, said prong having a keeper recess for engagement with said rocking shaft in the interlocking position, manipulable means on the outside of the female member to rock said shaft from said locking position into position to align the cut away portion with said keeper pocket to disengage said prong, gas actuated rocking means for rocking said rocking shaft into prong-releasing position, including a finger extended substantially radially from said rocking shaft, a guide in registry with said finger, a plurality of balls in said guide to transmit rocking force to said finger, a plunger in said female member engageable with said balls for forcing said balls against said finger for rocking said rocking shaft into prong-releasing position, means to conduct gas from one of said conduits against said plunger to move said plunger against said balls.

4. The single release device specified in claim 3, and resilient means to urge said plunger back to an initial gas receiving position, and resilient means to urge said shaft and said finger into prong-locking position.

* * * * *